(No Model.)  4 Sheets—Sheet 1.

H. AIKEN.
SHEAR TABLE.

No. 426,487.  Patented Apr. 29, 1890.

WITNESSES
Thomas W. Bakewell
Henry L. Gill

INVENTOR.
Henry Aiken (No Model.) 4 Sheets—Sheet 2.
H. AIKEN.
SHEAR TABLE.
No. 426,487. Patented Apr. 29, 1890.
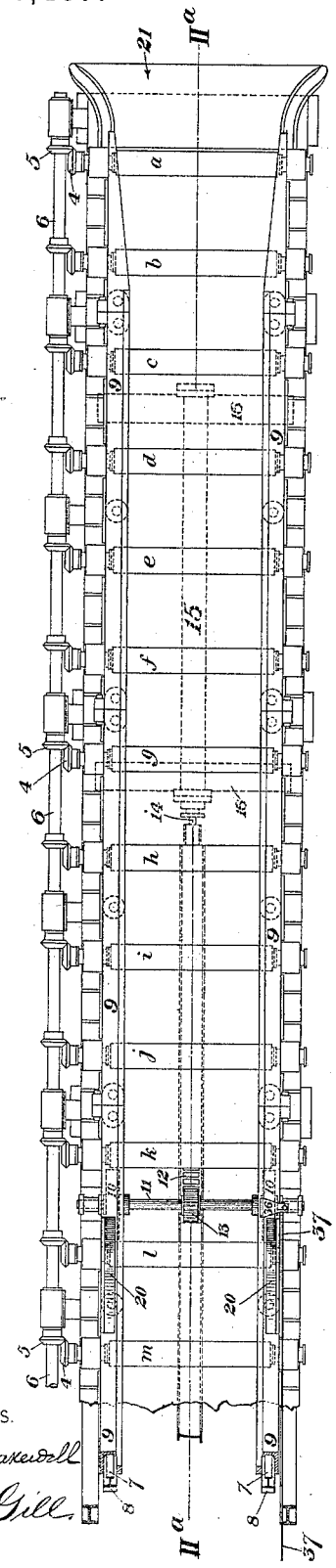
*Fig. 1ª.*
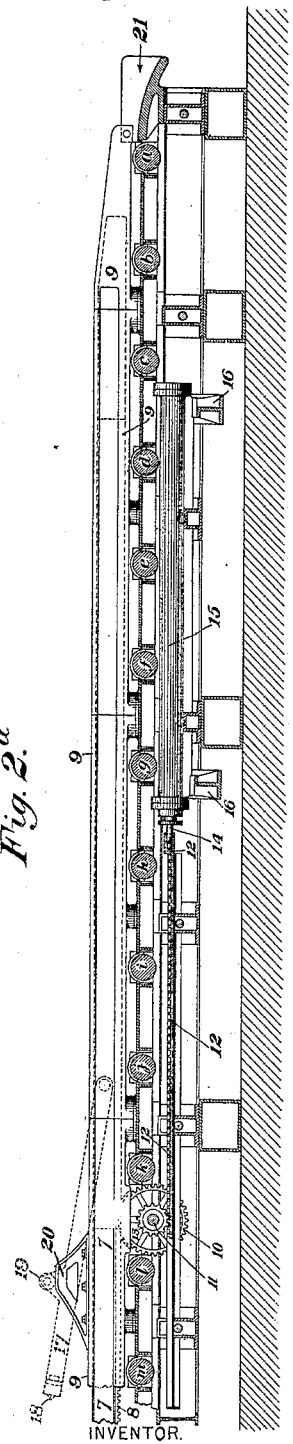
*Fig. 2ª.*
WITNESSES.
Thomas W. Bakewell
Henry L. Gill
INVENTOR.
Henry Aiken (No Model.) 4 Sheets—Sheet 3.

H. AIKEN.
SHEAR TABLE.

No. 426,487. Patented Apr. 29, 1890.

WITNESSES.
Thomas W. Bakewell
Henry L. Gill.

INVENTOR.
Henry Aiken (No Model.) 4 Sheets—Sheet 4.

H. AIKEN.
SHEAR TABLE.

No. 426,487. Patented Apr. 29, 1890.

WITNESSES.
Thomas W. Bakewell
Henry L. Gill

INVENTOR.
Henry Aiken

UNITED STATES PATENT OFFICE.

HENRY AIKEN, OF HOMESTEAD, PENNSYLVANIA.

SHEAR-TABLE.

SPECIFICATION forming part of Letters Patent No. 426,487, dated April 29, 1890.

Application filed February 23, 1889. Serial No. 300,857. (No model.)

*To all whom it may concern:*

Be it known that I, HENRY AIKEN, of Homestead, in the county of Allegheny and State of Pennsylvania, have invented a new and useful Improvement in Shear-Tables, of which the following is a full, clear, and exact description, reference being had to the accompanying drawings, forming part of this specification, in which—

Figure 1:
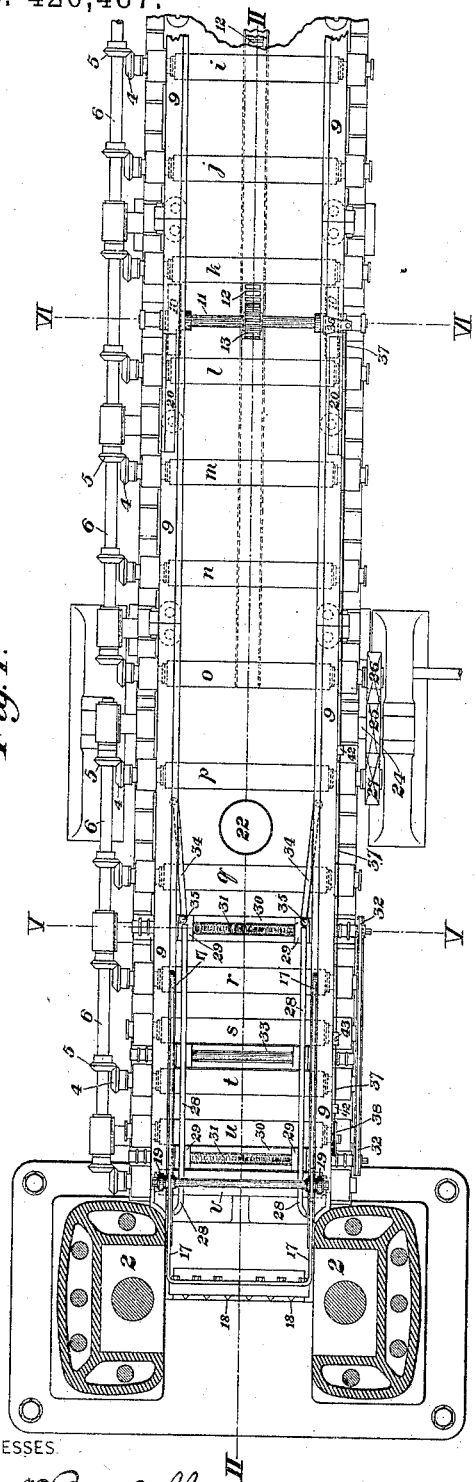
Figure 2:
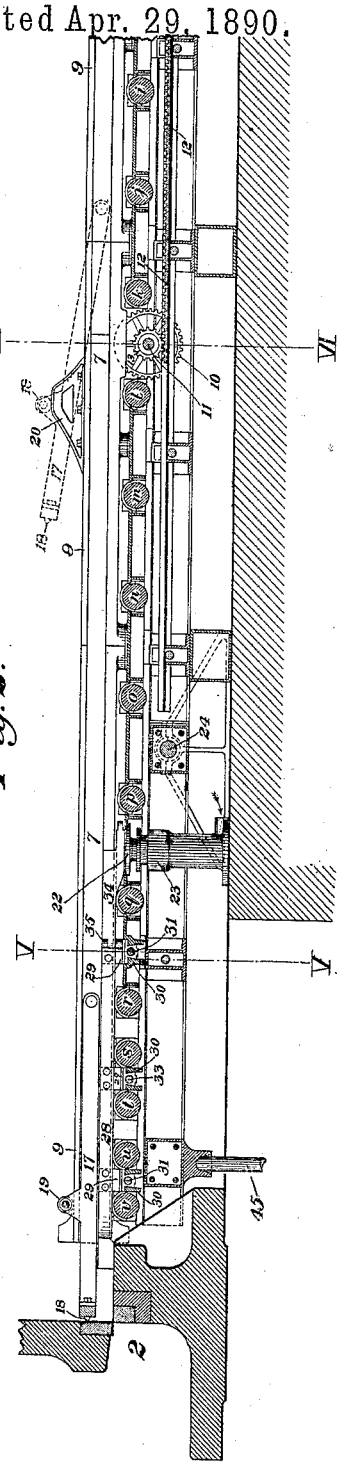
Figure 3:
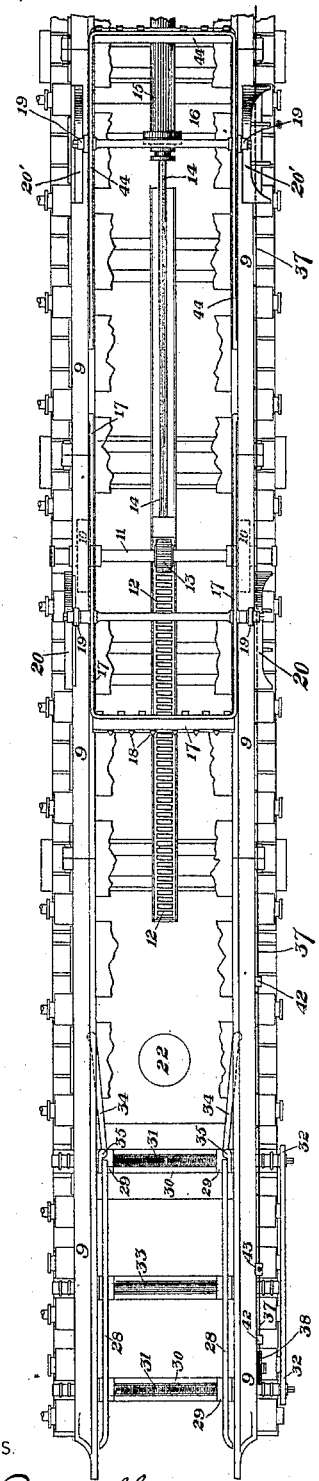
Figure 4:
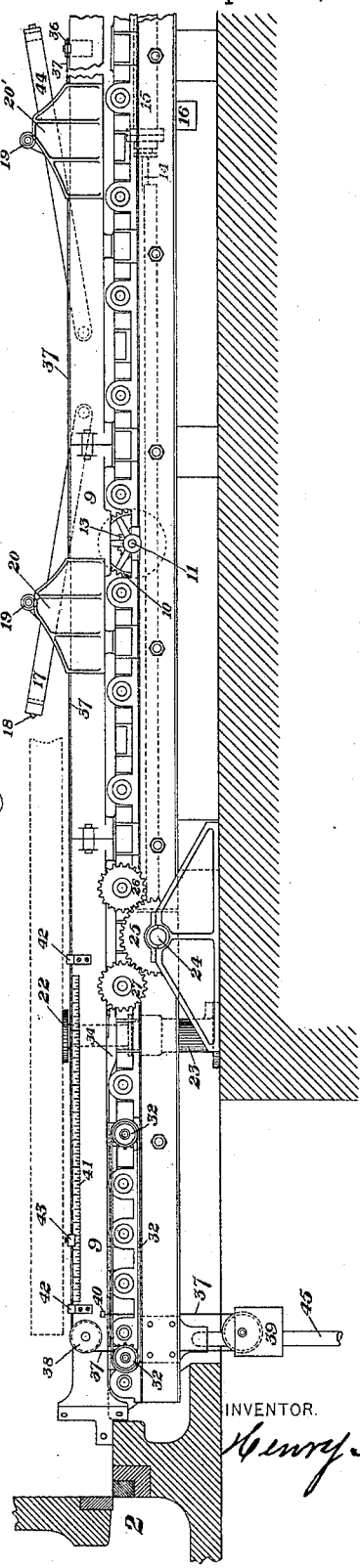
Figure 5:
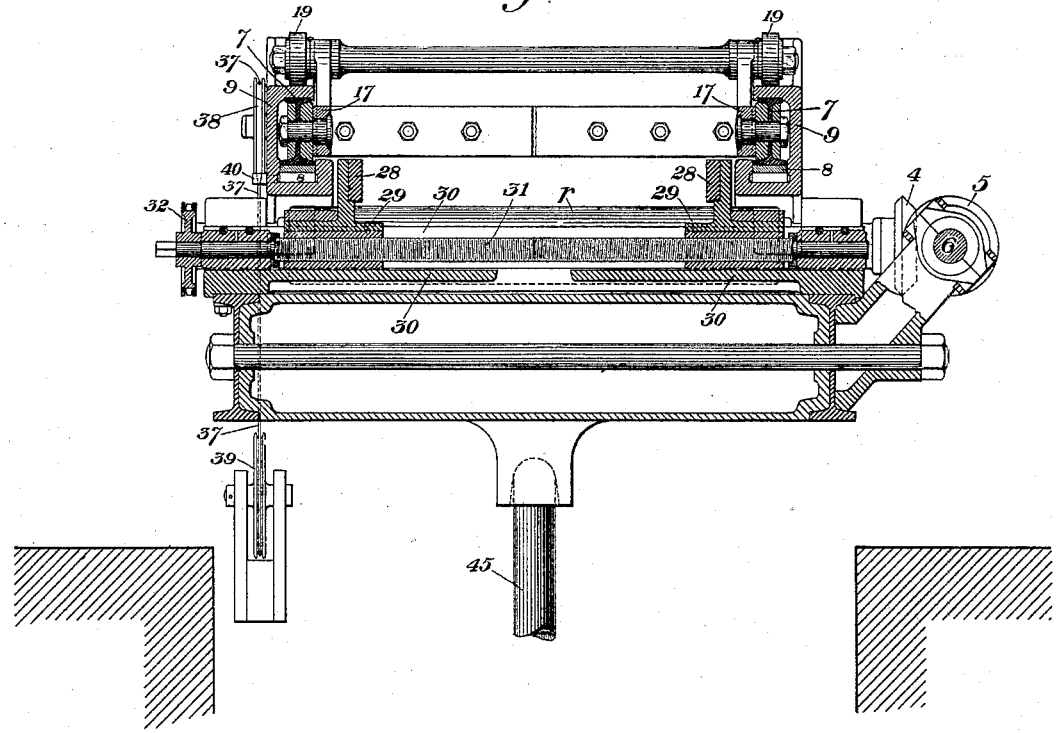
Figure 6:
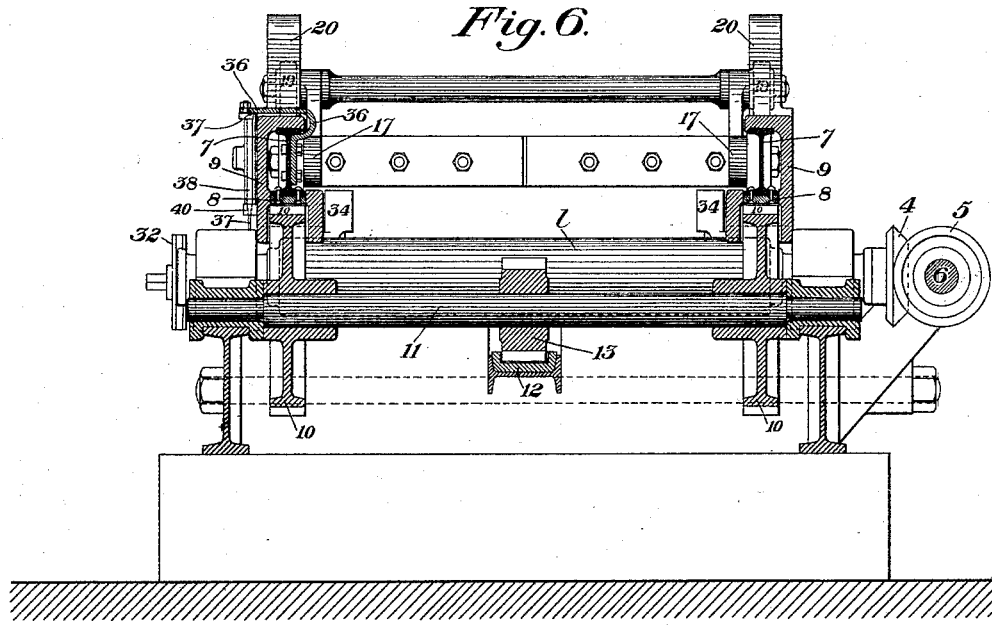

Figure 1 is a plan view of a portion of my improved apparatus. Fig. 2 is a vertical longitudinal section on the line II II of Fig. 1. Fig. 1$^a$ is a plan view of the remainder of the apparatus not shown in Fig. 1. Fig. 2$^a$ is a vertical longitudinal section on the line II$^a$ II$^a$ of Fig. 1$^a$. Fig. 3 is a plan view similar to Fig. 1, showing a modified construction of the apparatus. In this figure the conveying-rolls are omitted for clearness of illustration. Fig. 4 is a side elevation of Fig. 3. Fig. 5 is a vertical cross section on the line V V of Figs. 1 and 2. Fig. 6 is a similar section on line VI VI of Figs. 1 and 2.

Like symbols of reference indicate like parts in each.

In the drawings, 2 represents the frame of hydraulic shears, at the rear of which is arranged a feed-table consisting of a series of rollers, (designated in the drawings by letters of the alphabet,) said rollers being journaled at their ends in suitable bearings and provided with beveled gear-wheels 4, which are in gear with bevel-pinions 5 on a shaft 6, by means of which gearing the rolls may be driven to convey metal placed thereon up to the shears.

My invention relates to certain improvements used in conjunction with such shears and their feed-table for the purpose of feeding the metal thereto by a positive pushing action, whereby I am enabled to cut the metal with great accuracy into pieces of certain length with the use of but little manual labor.

It also consists in the use of peculiar mechanism for turning the piece on the table, in a device for gaging the length of the pieces cut, and in certain other features of invention set forth in the claims.

Within the scope of the invention thus stated the apparatus which I am about to describe may be modified in many particulars by those skilled in the art.

The mechanism shown in the drawings has been put by me to practical and successful use. I deem it to be the best form in which my invention may be embodied, and I shall describe it accurately and fully, premising, however, that by such particular description I do not intend to limit the scope of my invention to the details of construction herein set forth.

The pusher or feeding mechanism shown in the drawings is operated by a frame composed of side bars 7, Figs. 5 and 6, constituted, preferably, of I-beams, and having on their lower sides toothed racks 8, bolted to the I-beams. The I-beams and racks are supported in suitable strong side frames 9, Fig. 6, in which they are movable longitudinally, and they are moved therein by means of pinions 10 in gear with the racks. These pinions are mounted on a cross-shaft 11, driven by a toothed rack 12, the teeth of which are in gear with a small pinion 13 on the shaft. The rack 12 is moved longitudinally by the plunger 14 of a hydraulic cylinder 15, Figs. 1$^a$ and 2$^a$, or it may be driven by a steam-engine connected therewith by any suitable power-connection. In the drawings, Figs. 1, 1$^a$, 2, and 2$^a$, I have shown one shaft 11 and one pair of pinions 10 in gear with the racks 8, though, if desired, a greater or less number may be employed. The hydraulic cylinder 15 is upheld by supports 16, and the frame of the feed-table is also upheld by suitable supports, as clearly illustrated in the drawings.

From the construction above described it is evident that if the plunger 14 of the hydraulic cylinder be moved longitudinally the motion of the rack 12 thereby caused will rotate the pinions 13, and thereby through pinions 10 will move the racks 8 and the side rails 7 thereto attached. The metal pusher 17, by which the metal is fed to the shears, consists of a frame, preferably rectangular in form, composed of side bars pivoted at the rear ends to the rack-beams 7 and at the front ends connected by a cross-bar, by which the metal is directly engaged, and which is preferably studded with spiked projections 18, as shown in Fig. 1, to enable it to grasp the metal firmly. The side bars are furnished with wheels 19, which run on the surface of the side frames 9 and hold the pusher at a proper level to engage the metal on the feed-table, as shown by full lines in Fig. 2, and these side frames are provided with elevated or inclined portions 20, on which the wheels will mount when the pusher is moved into proximity thereto, and which will elevate the pusher on the axis of its pivotal connection with the rack-frame, as shown by dotted lines in Figs. 2, 2ª, and 6.

The operation of that portion of the apparatus which I have described is as follows: The metal piece to be sheared enters the end 21 of the feed-table, which is preferably flared, as shown in Figs 1ª and 2ª, and is situated at a convenient place to receive the metal as it is delivered from the rolls of the mill in which the shears are placed. The metal is now carried by the driven feed-rollers along the table until its rear end arrives at a point in advance of the cross-bar at the front of the pusher 17, which is now in an elevated position, as shown by dotted lines in Figs. 2 and 2ª, preferably until the front end of the piece projects between the knives of the shears. The crop end of the piece at the front end is now cut off by the action of the shears, and in order to feed the metal further after the shear-knives have been separated the rack 12 is drawn back by retracting the plunger 14 of the hydraulic motor, and the rotations of the pinions 13 and 10 thereby caused will drive the racks 8 and the side bars 7 toward the shears and will move therewith the pusher 17. As the wheels of the pusher descend from the inclined ways 20, its forward end will come to the level of the feed-table and will engage the metal thereon, and the further motion of the parts just described will feed the metal forward on the table with a positive pushing action between the knives of the shears with great accuracy and certainty, so that an exact portion thereof shall project within the shears in position to be severed. When both shears and pusher are actuated by hydraulic power, the valve controlling them may be operated by one person, and in order to save time in working the shears it is desirable, after a piece of the metal has been cut off by the shears and before the shear-knives are separated for the next cut, to start the pusher into action and to cause it to press the metal against the back of the knives, so that as soon as the knives are separated the piece will advance between them without delay.

The advantages of the above-described mechanism will be appreciated by those familiar with the extreme difficulty and inconvenience of manipulating heavy hot pieces of metal to bring them exactly into proper position under the shears. The metal piece may be fed forward by advancing the pusher until the piece has been cut into the number of lengths desired; but before cutting the piece into lengths it is desirable that the "crop ends" or defective pieces at both ends thereof be cut off, in order that, without further waste, the shearman may intelligently cut the metal into the proper number of pieces of a certain length. For this purpose I provide the feed-table with a turning device 22, which consists of the plunger of a hydraulic cylinder 23, which is set within the cylinder, so that it may be capable of turning on its vertical axis while supported by the motive fluid therein. When enough of the metal has been cut off to enable it to be turned, the plunger 22 is elevated, so as to raise the metal above the level of the feed-table sufficiently to clear the side frames thereof, as shown by dotted lines in Fig. 4, and then by means of hooks or otherwise the metal piece is turned end for end, the plunger 22 turning with it.

Instead of arranging the parts as I have described, so that the plunger may turn in the cylinder, the head of the plunger may be swiveled to the body portion thereof to effect the same result. I prefer, however, to construct it so that the plunger shall turn in the cylinder, and it is also desirable that, in addition to the turning of the plunger, its head should be rototary thereon, since by this capacity for double rotation the frictional resistance in turning the piece is very largely overcome.

The reasons for thus turning the metal and the advantages derived therefrom in practical use of the apparatus will be well understood by those skilled in the art.

In order to prevent friction on the bed-plate of the shears during the feeding of the metal, I prefer to make the end portion of the feed-table adjacent to the shears vertically movable, so that it may be elevated a short distance above the bed-plate to enable the metal to be fed, and that when it has been fed forward sufficiently the table may be lowered to deposit the metal in position to be cut. To effect this I make a small section of the table at the front portion thereof separate from the rear portion and pivot the rear end of the front section to a shaft 24, on which is a driving-pinion 25, Figs. 1, 2, and 4. This pinion is in gear with gear-wheels 26 and 27—one on the rear section of the table and the other on the front or pivoted section—which gear-wheels connect the feed-rollers of the two sections in such manner that they shall remain constantly in gear at the different positions into which the front portion of the table may be raised. The table is elevated on the axis of the shaft 24 by means of a hydraulic lifter 45, which bears upon the under side of the front end thereof.

In order to direct the metal piece in its entrance into the shears and to keep it in the middle thereof, I employ parallel guide-bars 28, Fig. 3, bolted at the ends to nuts 29, which are mounted in slides 30 and encircle cross-shafts 31, provided with right and left hand threaded portions fitting in the nuts. The shafts are connected at the ends by chain-and-sprocket gearing 32, Figs. 1, 3, 4, and 5, and by actuating this gearing by hand or otherwise the guide-bars may be brought together or separated conformably to the width of the metal piece. 33 is a guide-rod set between the shafts 31 to strengthen and balance the guide-bars in their lateral motions. 34 are extensions of the guide-bars 28, connected thereto by pivotal connection 35, and at their other ends provided with pins or tongues fitting in longitudinal slots in the side rails of the table. The extension-rods 34 form a flaring mouth to receive and direct the metal between the guide-bars. When the piece has been fed to the shears as far as desired, the pusher may be drawn back by reverse action of the motor 15 into position to feed another piece. When the pusher arrives at the end of its travel, its wheels mount the ways 20 and elevate the cross-bar of the pusher above the feed-rollers, so as to leave the way clear for the next piece of metal to be fed beneath the pusher.

The construction of the pusher may be modified in a variety of ways to accomplish the results which I have described. For example, instead of using the inclined ways 20 to raise it from the level of the feed-rollers, the same end may be accomplished by forming the pusher with a flap or gate which is movable in one direction to allow the passage of the metal beneath the same, but is not movable in the other direction, and other changes will suggest themselves to the skilled mechanic.

For the purpose of measuring accurately the lengths of the metal piece to be fed into the shears I employ a gage which moves with the piece. The preferable construction of this gage and of its accessory parts is shown in Figs. 1, 3, 4, and 6 and is as follows: 36 is an arm secured to the rear end of one of the side beams 7, and 37 is a cord which extends from the arm 36 over a sheave 38 at the front end of the feed-table and around a weighted sheave 39 to a point of attachment 40 on the feed-table. 41 is a scale marked on or applied to the feed-table near the front thereof. 42 are guides which direct the course of the cord in a line in close proximity to the scale 41, and 43 is an index-piece movably and adjustably secured to the cord. As the side frames 7 move forward longitudinally to feed the metal piece to the shears, the weighted sheave 39 will be permitted to descend and to draw forward the cord 37, and as it descends the index 43 will move therewith over the face of the scale 41. The index will therefore indicate by its passage over the scale the exact extent of motion of the pusher, and as the metal piece is fed to the shears by a positive pushing action, slipping thereof being impossible, the extent of its feed may be gaged with very great accuracy. This feature of my invention is susceptible of many modifications. For example, the scale may be made movable and the index stationary, and the mechanism for moving the parts may be varied mechanically in a great variety of ways.

In Figs. 3 and 4 I show an arrangement in which two positively-acting pushers are employed for the purpose of feeding the metal to the shears, this construction being especially useful in cases where the metal to be sheared is of considerable length, and where it would be difficult to employ a single pusher having a sufficient length of stroke to feed it. As shown in Fig. 4, the front pusher is constructed in a manner similar to that before described. With reference to Figs. 3 and 4 the rear pusher 44 is pivoted at its front end to the side beams 7, and the cross-bar which engages the metal is at the rear end of the pusher-frame. This frame is also provided with upwardly-inclined ways 20', which are fixed to the frame 9 of the feed-table in the rear of the inclined ways 20. Figs. 3 and 4 show the feeding mechanism in its most retracted position, both the pushers being elevated in order to allow the piece to pass beneath them. When in this position, the piece is carried forward by the feed-rollers until its rear end passes under the cross-bar at the rear of the pusher 44, and the side beams 7 with their racks are then caused to advance in the manner already explained. This causes the cross-bar at the rear end of the pusher 44 to engage the end of the metal and to push it forward toward the shears. When the metal has been pushed forward to the full extent of the motion of the racks, the pushers 17 and 44 are retracted by drawing back the racks until the cross-bar at the front end of the pusher 17 passes to the rear of the metal. The pushers may now be again advanced, and the further feeding of the metal will be performed by the front pusher 17.

I claim—

1. The combination of the shears, a table leading thereto, a pusher, and a motor which actuates the pusher, substantially as and for the purposes described.

2. The combination of the feed-table, a movable frame or carriage, a motor which moves the same, and a pusher attached to the frame or carriage and adapted to engage and push a metal piece placed thereon and to be removed from the path of the metal on the table to permit passage of the succeeding metal piece, substantially as and for the purposes described.

3. The combination of the table, a movable frame or carriage, a motor which moves the same, a pusher pivotally connected with the frame or carriage and moving therewith, and an inclined way which engages the pusher and elevates the same out of the path of the metal, substantially as and for the purposes described.

4. The combination of the table, a movable frame or carriage, a motor which reciprocates the same, and pushers attached to and moving with the said frame or carriage, substantially as and for the purposes described.

5. The combination, with the shears, of a table, a pusher, and a gage which moves with the pusher to indicate the extent of feed of the metal, substantially as and for the purposes specified.

6. The combination, with the shears, of a table, a pusher, a cord connected with the pusher and with a weight, a scale, and an index adjustably mounted on the cord, substantially as and for the purposes described.

7. The combination, with the shears and the feed-table, of a rotary support arranged beneath the feed-table in proximity to the shears and adapted to turn the metal piece and to present the rear end thereof to the shears, substantially as and for the purposes described.

8. The combination, with the shears, the feed-table leading thereto, and a pusher by which the metal is fed to the shears, of laterally-movable guide-bars situate at the end of the table adjacent to the receiving side of the shears, substantially as and for the purposes described.

9. The combination, with the shears and the feed-table leading thereto and provided with means for impelling the metal toward the shears, of laterally-movable guide-bars arranged at the end of said table next to the shears, and diverging bars 34, each connected at one end with the guide-bars and at the other end movably connected with the frame of the feed-table, substantially as and for the purposes described.

10. The combination, with the table having side frames 9, of side beams and racks which move thereon, pinions which actuate the racks, and a pusher having wheels which travel on the side frames, substantially as and for the purposes described.

11. The combination, with the feed-table and the pusher-frame or carriage, of a hydraulic cylinder and its plunger, and gearing connecting the plunger with the said pusher-frame or carriage, substantially as and for the purposes described.

In testimony whereof I have hereunto set my hand this 14th day of February, A. D. 1889.

HENRY AIKEN.

Witnesses:
W. B. CORWIN,
JNO. K. SMITH.